(12) United States Patent
Qiu et al.

(10) Patent No.: US 12,060,917 B2
(45) Date of Patent: Aug. 13, 2024

(54) COMMON CONTROL APPARATUS FOR PARKING AND CLUTCH, OPERATING METHOD THEREOF, AND VEHICLE

(71) Applicants: YIWU GEELY AUTOMATIC TRANSMISSION CO., LTD, Zhejiang (CN); ZHEJIANG GEELY HOLDING GROUP CO., LTD, Zhejiang (CN)

(72) Inventors: Zhiling Qiu, Hangzhou (CN); Jun Fu, Hangzhou (CN); Nan Cui, Hangzhou (CN); Dingxiang Pan, Hangzhou (CN); Yunyong Jing, Hangzhou (CN); Yougang Wang, Hangzhou (CN); Zhenggong Xu, Hangzhou (CN); Xiaozhe Lin, Hangzhou (CN)

(73) Assignees: YIWU GEELY AUTOMATIC TRANSMISSION CO., LTD, Zhejiang (CN); ZHEJIANG GEELY HOLDING GROUP CO., LTD, Zhejiang (CN)

( * ) Notice: Subject to any disclaimer, the term of this patent is extended or adjusted under 35 U.S.C. 154(b) by 92 days.

(21) Appl. No.: 17/996,101

(22) PCT Filed: Apr. 13, 2020

(86) PCT No.: PCT/CN2020/084519
§ 371 (c)(1),
(2) Date: Oct. 13, 2022

(87) PCT Pub. No.: WO2021/207885
PCT Pub. Date: Oct. 21, 2021

(65) Prior Publication Data
US 2023/0220897 A1 Jul. 13, 2023

(51) Int. Cl.
*F16D 67/02* (2006.01)
*F16D 11/00* (2006.01)
(Continued)

(52) U.S. Cl.
CPC .............. *F16D 67/02* (2013.01); *F16D 11/10* (2013.01); *F16D 23/12* (2013.01); *F16D 23/14* (2013.01);
(Continued)

(58) Field of Classification Search
CPC .... F16H 63/18; F16H 63/304; F16H 63/3069; F16H 2063/3073; F16H 2063/3089;
(Continued)

(56) References Cited

U.S. PATENT DOCUMENTS 6,725,962 B1 4/2004 Fukuda
2007/0261511 A1 11/2007 Ho
(Continued)

FOREIGN PATENT DOCUMENTS

CN 2813393 Y 9/2006
CN 101463901 A 6/2009
(Continued)

OTHER PUBLICATIONS

International Search Report and Written Opinion for PCT/CN2020/084519 (ISA/CN) mailed Jan. 19, 2021 (17 pages).
(Continued)

*Primary Examiner* — Richard M Lorence
(74) *Attorney, Agent, or Firm* — Westbridge IP LLC (57) ABSTRACT

Disclosed are a common control apparatus for parking and a clutch, an operating method thereof, and a vehicle. The common control apparatus for parking and a clutch comprises a parking mechanism, a clutch mechanism, and a motor; the parking mechanism comprises a positioning plate, a rotating drum connected to the positioning plate, a
(Continued)

cam groove formed on the rotating drum, an elastic positioner, and positioning grooves; the positioning plate rotates under the driving of the motor; the elastic positioner interacts with the positioning grooves; the rotating drum can rotate to positions corresponding to parking lock, parking disengagement, clutch engagement, and clutch disengagement; the clutch mechanism comprises a clutch shifting fork assembly and a shifting fork driving cam; the cam groove comprises a straight groove and an engagement rotation groove; and when the shifting fork driving cam is located in the engagement rotation groove, the engagement rotation groove is engaged with the shifting fork driving cam to drive the clutch shifting fork assembly to move axially. The present invention simultaneously controls the disengagement and engagement of the parking mechanism and the clutch by means of one motor, and the apparatus has the advantages of simple structure, easy manufacturing, low cost, and high efficiency.

14 Claims, 5 Drawing Sheets

(51) Int. Cl.
| | | |
|---|---|---|
| *F16D 11/10* | (2006.01) | |
| *F16D 23/12* | (2006.01) | |
| *F16D 23/14* | (2006.01) | |
| *F16D 28/00* | (2006.01) | |
| *F16H 63/18* | (2006.01) | |
| *F16H 63/30* | (2006.01) | |
| *F16H 63/34* | (2006.01) | |

(52) U.S. Cl.
CPC ........... *F16H 63/18* (2013.01); *F16H 63/304* (2013.01); *F16H 63/3408* (2013.01); *F16H 63/3425* (2013.01); *F16H 63/3466* (2013.01); *F16D 2011/002* (2013.01); *F16D 2023/123* (2013.01); *F16D 2023/141* (2013.01); *F16D 28/00* (2013.01); *F16H 2063/3089* (2013.01)

(58) Field of Classification Search
CPC ............. F16H 63/3408; F16H 63/3425; F16H 63/3466; Y10T 74/20073; F16D 67/02; F16D 2011/002; F16D 11/10; F16D 23/12; F16D 2023/123; F16D 23/14; F16D 2023/141; F16D 28/00
See application file for complete search history.

(56) References Cited

U.S. PATENT DOCUMENTS

| | | | |
|---|---|---|---|
| 2007/0272511 A1* | 11/2007 | Saitoh | F16H 63/3466 192/219.5 |
| 2014/0060994 A1 | 3/2014 | Burgardt | |
| 2016/0146344 A1 | 5/2016 | Tsukamoto et al. | |
| 2020/0158234 A1* | 5/2020 | Kwon | F16H 63/3466 |
| 2020/0158238 A1* | 5/2020 | Kwon | F16H 63/304 |

FOREIGN PATENT DOCUMENTS

| | | |
|---|---|---|
| CN | 101654099 A | 2/2010 |
| CN | 207421258 U | 5/2018 |
| CN | 108533698 A | 9/2018 |
| CN | 208295051 U | 12/2018 |
| CN | 109282027 A | 1/2019 |
| CN | 110939732 A | 3/2020 |
| CN | 111577889 A | 8/2020 |
| EP | 2706270 A2 | 3/2014 |
| JP | 2011052771 A | 3/2011 |
| JP | 2015113866 A | 6/2015 |
| WO | WO 2019/174356 A1 | 9/2019 |

OTHER PUBLICATIONS

Supplementary European Search Report for EP Patent Application No. 20930706.5 dated Aug. 25, 2023 (4 pages).
1st Office Action for EP Patent Application No. 20930706.5 dated Sep. 6, 2023 (5 pages).
1st Search Report for China Patent Application No. 202080098568.5 dated May 5, 2023 (2 pages).
1st Office Action for China Patent Application No. 202080098568.5 dated May 6, 2023 (5 pages).
Notice of Allowance for China Patent Application No. 202080098568.5 dated Aug. 24, 2023 (2 pages).
Notice of Reasons for Refusal issued in counterpart Japanese Patent Application No. JP 2022-561616, dated Jan. 30, 2024.
Office Action issued in counterpart European Patent Application No. EP 20930706.5, dated Jan. 18, 2024.

* cited by examiner

COMMON CONTROL APPARATUS FOR PARKING AND CLUTCH, OPERATING METHOD THEREOF, AND VEHICLE

CROSS-REFERENCE TO RELATED APPLICATIONS

This application is a national phase entry of International Application No. PCT/CN2020/084519, filed Apr. 13, 2020, the entire contents of which are incorporated herein by reference.

FIELD OF THE INVENTION

The present invention relates to the technical field of transmissions, and in particular to a common control apparatus for parking and a clutch, an operating method thereof, and a vehicle.

BACKGROUND OF THE INVENTION

At present, a hybrid electric vehicle transmission commonly uses a clutch to incorporate an engine into a driving system, so that the vehicle is directly driven by the engine when traveling at a high speed, and fuel economy of the vehicle is improved. Generally, the clutch used is a multiple friction disc wet clutch, and a hydraulic cylinder, a hydraulic pump, a proportional pressure solenoid valve, and a valve plate are additionally used to control torque. These components are high in cost and power consumption, and the multiple friction disc wet clutch is high in manufacturing cost and occupies a large space, which makes cost of entire transmission higher, limiting the use of the hybrid electric transmission. In addition, the hybrid electric vehicle transmission usually has a parking mechanism. With the improvement of automation, in recent years, more and more vehicles use electrically or hydraulically controlled parking mechanisms. Whether it is electrically or hydraulically controlled, additional driving power and control apparatuses are required, which greatly increases energy consumption and cost of the transmission. How to replace the friction disc wet clutch, reduce the cost and energy consumption of the clutch and the control apparatus therefor, is a technical problem to be urgently solved in the art.

BRIEF DESCRIPTION OF THE INVENTION

The present invention aims to provide a common control apparatus for parking and a clutch, an operating method thereof, and a vehicle, so as to overcome the technical problem in the above background.

The present invention is implemented by the following technical solutions:

According to an aspect of the present invention, provided is a common control apparatus for parking and a clutch, the control apparatus including a parking mechanism, a clutch mechanism, and a motor; the parking mechanism includes a positioning plate, a rotating drum, an elastic positioner, and several positioning grooves; the rotating drum is in linkage connection to the positioning plate, the positioning grooves are arranged on the positioning plate, the positioning plate rotates under the driving of the motor; the elastic positioner interacts with the positioning grooves; the rotating drum can rotate to positions corresponding to parking lock, parking disengagement, clutch engagement, and clutch disengagement; the clutch mechanism includes a clutch shifting fork assembly and a shifting fork driving cam arranged on the clutch shifting fork assembly, and the shifting fork driving cam drives the clutch shifting fork assembly to move axially during rotating; the rotating drum is provided with a cam groove, and the cam groove includes an engagement rotation groove and a straight groove perpendicular to an axis; when the rotating drum rotates between the positions of the parking lock and the parking disengagement, the shifting fork driving cam is located in the straight groove; and when the rotating drum rotates between the positions of the parking disengagement and the clutch engagement, the shifting fork driving cam is located in the engagement rotation groove, and the engagement rotation groove is engaged with the shifting fork driving cam.

Further, the shifting clutch shifting fork assembly includes a shifting fork guiding shaft, an outer shifting fork, and an inner shifting fork, where the inner shifting fork sleeves the shifting fork guiding shaft, the outer shifting fork sleeves the inner shifting fork, the outer shifting fork is provided with a fixing pin, the inner fork is provided with an axial groove, and the fixing pin slides in the axial groove.

Further, a shifting fork spring is arranged between the outer shifting fork and the inner shifting fork, and the outer shifting fork drives the inner shifting fork by means of the shifting fork spring.

Further, the clutch mechanism further includes a clutch input shaft, a clutch sliding gear sleeve, and a clutch gear hub, and the clutch sliding gear sleeve sleeves the clutch gear hub; the clutch input shaft is provided with clutch dog teeth; the clutch sliding gear sleeve is connected to the shifting fork guiding shaft by means of a shifting fork foot, and the shifting fork foot is arranged on the periphery of the clutch sliding gear sleeve; and the clutch sliding gear sleeve is provided with inner teeth and a circumferential groove cooperated with the inner shifting fork, the clutch sliding gear sleeve is inserted into a tooth gap of the clutch dog teeth under an action of the shifting fork spring, the clutch gear hub is provided with transmission teeth, and the inner teeth are respectively engaged with the clutch dog teeth and the transmission teeth.

Further, the parking mechanism further includes a parking actuating lever, and an end portion of the parking actuating lever is provided with a driving elbow; and the positioning plate is provided with a hinge hole, the driving elbow is hinged with the hinge hole, and when the positioning plate rotates, the parking actuating lever is pushed towards or pulled out of the position of the parking lock.

Further, the parking mechanism further includes a guiding plate, a parking pawl, and a parking ratchet connected to a transmission output shaft; the guiding plate is arranged on a transmission case, and the parking pawl is arranged on the parking actuating lever; and under an action of the guiding plate, the parking actuating lever presses the parking pawl to the parking ratchet by means of a spring and a wedge, and the parking pawl is engaged with the parking ratchet.

Further, the parking mechanism further includes a parking pawl rotating shaft and a parking pawl return spring; and the parking pawl rotates around the parking pawl rotating shaft, the parking pawl return spring sleeves the parking pawl rotating shaft, and the torque of the parking pawl return spring causes the parking pawl to rotate in a direction of disengaging the parking ratchet.

Further, the positioning plate is connected to the rotating drum by means of a rotating shaft, and the positioning plate and the rotating drum each are connected to the rotating shaft by means of a fixing pin.

Further, an output shaft of the motor is provided with a driving gear, the positioning plate is provided with a toothed arc, and the driving gear is engaged with the toothed arc.

According to another aspect of the present invention, provided is an operating method of the common control apparatus for parking and a clutch, the operating method includes the following steps: after the motor is started, driving the positioning plate by the motor to rotate, and allowing the rotating drum to rotate to positions corresponding to parking lock, parking disengagement, clutch engagement, and clutch disengagement respectively, wherein when the rotating drum rotates between the positions of the parking disengagement and the clutch engagement, the shifting fork driving cam is located in the engagement rotation groove, the engagement rotation groove is engaged with the shifting fork driving cam, and the shifting fork driving cam drives the clutch shifting fork assembly to move axially during rotating; and after the parking lock, the parking disengagement, the clutch engagement or the clutch disengagement is completed, allowing the elastic positioner to interact with the positioning grooves to position the positioning plate, and then powering off the motor.

Further, the parking mechanism further includes a parking actuating lever, a guiding plate, a parking pawl, and a parking ratchet connected to a transmission output shaft; the guiding plate is arranged on a transmission case, and the parking pawl is arranged on the parking actuating lever; and when the rotating drum is rotated to the position of the parking lock, under an action of the guiding plate, the parking actuating lever presses the parking pawl to the parking ratchet, and a pawl tooth on the parking pawl enters a tooth gap of the parking ratchet to lock the parking ratchet.

Further, an end portion of the parking actuating lever is provided with a driving elbow, the positioning plate is provided with a hinge hole, and the driving elbow is hinged with the hinge hole; and when the rotating drum is in the position of the parking lock, the positioning plate is rotated in a direction opposite to the direction along which it is rotated to the position of the parking lock, and the parking actuating lever is pulled out of the position of the parking lock by means of the hinge hole.

Further, the clutch shifting fork assembly includes an outer shifting fork, an inner shifting fork, and a shifting fork spring, the outer shifting fork sleeves the inner shifting fork, and the outer shifting fork drives the inner shifting fork by means of the shifting fork spring; the clutch mechanism further includes a clutch input shaft, a clutch sliding gear sleeve, and a clutch gear hub, the clutch input shaft is provided with clutch dog teeth, the clutch sliding gear sleeve is provided with inner teeth, and the clutch gear hub is provided with transmission teeth; and when the rotating drum rotates between the positions of the parking disengagement and the clutch engagement, the shifting fork driving cam is rotated to drive the outer shifting fork to move axially, the outer shifting fork drives the inner shifting fork by means of the shifting fork spring, the inner shifting fork drives the clutch sliding gear sleeve to be inserted into a tooth gap of the clutch dog teeth, and the inner teeth of the clutch sliding gear sleeve are respectively engaged with the clutch dog teeth and the transmission teeth to drive the transmission teeth to run at a same speed.

Further, when the rotating drum is in the position of the clutch engagement, the positioning plate is rotated in an opposite direction to the position of the clutch engagement, so that the outer shifting fork moves axially until the inner teeth of the clutch sliding gear sleeve are disengaged from the clutch dog teeth, and the elastic positioner positions the rotating drum and the outer shifting fork in the position of the clutch disengagement.

According to another aspect of the present invention, further provided is a vehicle, including the common control apparatus for parking and a clutch.

Implementing the present invention has the following beneficial effects:

1. According to the common control apparatus for parking and a clutch, compared with a friction disc wet clutch in the prior art, a dog tooth clutch saves the costs of friction discs, a hydraulic cylinder, a hydraulic pump, a proportional pressure solenoid valve, a valve plate and other components; the clutch mechanism and the parking mechanism share a control motor, so the power consumption is very low; and since the rotating drum may be positioned by the elastic positioner and the positioning grooves, power supply of the motor is not required after the clutch is engaged, thus saving the power consumption and improving the efficiency of the transmission.

2. According to the common control apparatus for parking and a clutch and the operating method thereof, disengagement and engagement of the parking mechanism and the clutch are simultaneously controlled by one motor, and the common control apparatus is simple in structure, small in space, easy to manufacture, low in cost and high in efficiency, and can effectively solve the problems of high cost and high power consumption of a clutch actuating apparatus of an existing hybrid electric transmission; and the common control apparatus for parking and a clutch and the operating method thereof of the present invention are especially suitable for a hybrid electric vehicle transmission having controllable rotational speed difference, a low engagement time requirement and an electric parking mechanism.

BRIEF DESCRIPTION OF THE DRAWINGS

In order to describe the technical solutions and advantages in the embodiments of the present invention or the prior art more clearly, the following briefly introduces the accompanying drawings required for describing the embodiments or the prior art. Apparently, the accompanying drawings in the following description show only some embodiments of the present disclosure, and those of ordinary skill in the art may still derive other drawings from these drawings without any creative efforts.

In the accompany drawings, reference numerals correspond to: 1-engine, 11-clutch input shaft, 111-spline, 113-clutch dog tooth, 12-engine damper, 13-connecting web plate, 20-wheel, 2-P1 generator, 3-P3 motor, 31-rotor, 33-transmission output shaft, 4-bearing support assembly, 41-roller bearing, 42-first ball bearing, 43-thrust bearing, 45-second ball bearing, 51-motor, 511-driving gear, 52-positioning plate, 521-toothed arc, 522-cam groove, 523-rotating drum, 524-positioning groove, 526-hinge hole, 53-rotating shaft, 54-elastic positioner, 55-outer shifting fork, 551-shifting fork driving cam, 552-fixing pin, 553-outer shifting fork sleeve, 56-parking actuating lever, 561-driving elbow, 563-spring, 564-wedge, 57-guiding plate, 571-pawl limiting base plate, 58-parking pawl, 581-parking pawl rotating shaft, 582-parking pawl return spring, 583-pawl tooth, 584-parking pawl limiting surface, 59-parking ratchet, 591-parking ratchet tooth, 6-housing, 61-cover plate, 62-front housing, 63-rear housing, 621-fixing shaft hole, 7-clutch, 71-clutch sliding gear sleeve, 711-inner tooth, 712-circumferential groove, 713-chamfer, 72-clutch gear hub, 721-transmission tooth, 722-gear hub spline, 75-shifting fork spring, 76-inner shifting fork, 761-axial groove, 762-shifting fork foot, 77-shifting fork guiding shaft, 84-clutch output shaft, 97-differential, and 34, 91, 83, 93, 95, and 96 are gears, which respectively form gear pairs 34/91, 83/93, and 95/96.

DETAILED DESCRIPTION

The present invention will be further described in detail in conjunction with the following embodiments to make the objects, technical solutions and advantages of the present invention more apparent. Apparently, the embodiments described are only some of the embodiments of the present invention, not all of them. All other embodiments obtained by those of ordinary skill in the art based on the embodiments of the present invention without any creative efforts shall fall within the protection scope of the present invention.

Embodiments

Figure 1:
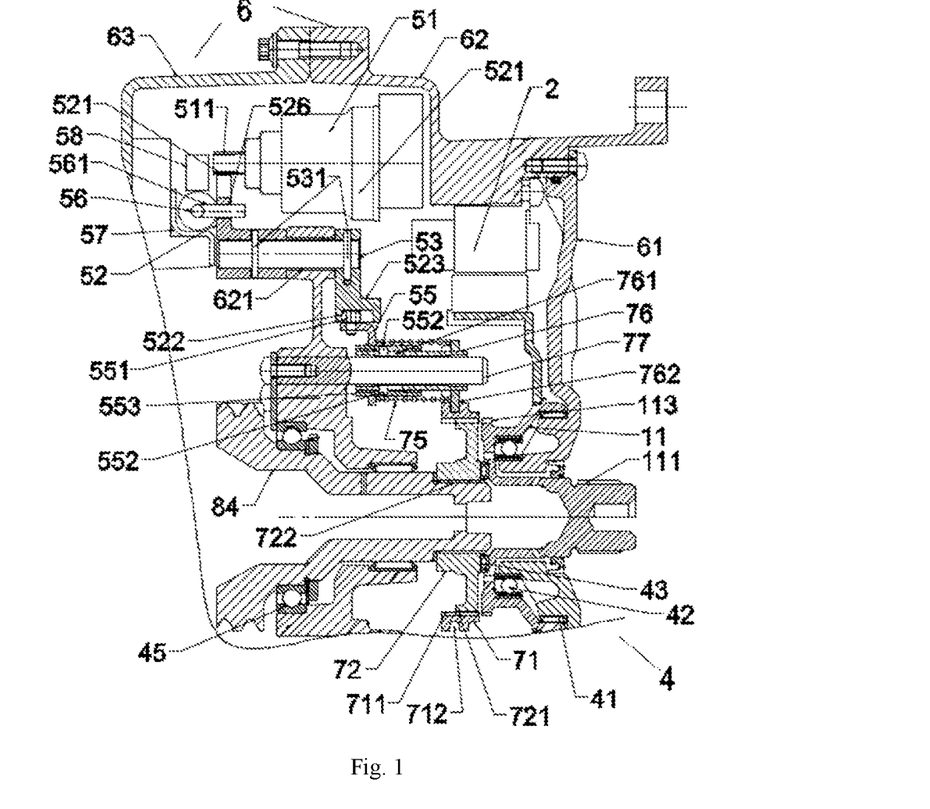
FIG. 1 is a cross-sectional view of a common control apparatus according to an embodiment of the present invention.
Figure 2:
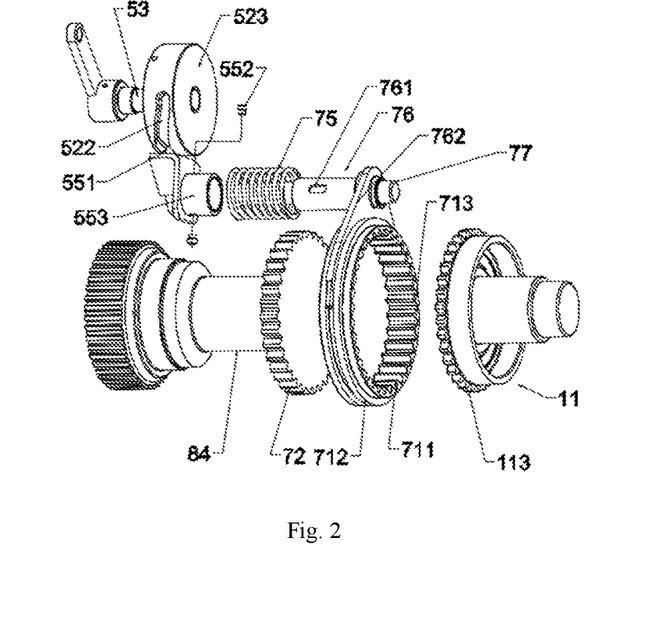
FIG. 2 is a 3D schematic diagram of some of components of a common control apparatus according to an embodiment of the present invention.

According to an embodiment of the present invention, there is provided a common control apparatus for parking and a clutch. Referring to FIGS. 1 and 2, the common control apparatus for parking and a clutch of this embodiment includes a parking mechanism, a clutch mechanism, and a motor 51; the parking mechanism includes a positioning plate 52, a rotating drum 523, an elastic positioner 54, and several positioning grooves 524; the rotating drum 523 is in linkage connection to the positioning plate 52, the positioning grooves 524 are arranged on the positioning plate 52, and the positioning plate 52 rotates under the driving of the motor 51; the elastic positioner 54 interacts with the positioning grooves 524; the rotating drum 523 can rotate to positions corresponding to parking lock, parking disengagement, clutch engagement, and clutch disengagement; the clutch mechanism includes a clutch shifting fork assembly and a shifting fork driving cam 551 arranged on the clutch shifting fork assembly, and the shifting fork driving cam 551 drives the clutch shifting fork assembly to move axially during rotating; the rotating drum 523 is provided with a cam groove 522, and the cam groove 522 includes an engagement rotation groove and a straight groove perpendicular to an axis; when the rotating drum 523 rotates between the positions of the parking lock and the parking disengagement, the shifting fork driving cam 551 is located in the straight groove, and the straight groove is not engaged with the shifting fork driving cam 551, so the shifting fork assembly does not move axially; and when the rotating drum 523 rotates between the positions of the parking disengagement and the clutch engagement, the shifting fork driving cam 551 is located in the engagement rotation groove, and the engagement rotation groove is engaged with the shifting fork driving cam 551 to drive the clutch shifting fork assembly to move axially.

As a specific embodiment, the shifting fork driving cam 551 is connected to the clutch shifting fork assembly by means of an outer shifting fork sleeve 553, the clutch shifting fork assembly includes a shifting fork guiding shaft 77, an outer shifting fork 55, and an inner shifting fork 76, the inner shifting fork 76 sleeves the shifting fork guiding shaft 77, the outer shifting fork 55 sleeves the inner shifting fork 76, the outer shifting fork 55 is provided with a fixing pin 552, the inner shifting fork 76 is provided with an axial groove 761, and the fixing pin 552 slides in the axial groove 761. A shifting fork spring 75 is further arranged between the outer shifting fork 55 and the inner shifting fork 76, and the outer shifting fork 55 drives the inner shifting fork 76 by means of the shifting fork spring 75.

As a specific embodiment, the clutch mechanism further includes a clutch input shaft 11, a clutch sliding gear sleeve 71, and a clutch gear hub 72, the clutch gear hub 72 is provided with a gear hub spline 722 connected to a clutch output shaft 84, and the clutch sliding gear sleeve 71 sleeves the clutch gear hub 72; the clutch input shaft 11 is provided with clutch dog teeth 113; the clutch sliding gear sleeve 71 is connected to the shifting fork guiding shaft 77 by means of a shifting fork foot 762, and the shifting fork foot 762 is arranged on the periphery of the clutch sliding gear sleeve 71; and the clutch sliding gear sleeve 71 is provided with inner teeth 711 and a circumferential groove 712 cooperated with the inner shifting fork 76, the clutch sliding gear sleeve 71 is inserted into a tooth gap of the clutch dog teeth 113 under an action of the shifting fork spring 75, the clutch gear hub 72 is provided with transmission teeth 721, and the inner teeth 711 are respectively engaged with the clutch dog teeth 113 and the transmission teeth 721. The shifting fork assembly controls a gear shifting movement of the clutch sliding gear sleeve 71 by means of a pre-compressed shifting fork spring 75. A shifting fork input end may also be moved in place and be fixed to an engaged position even when two ends of the clutch have a large rotational speed difference and thus cannot be engaged, or tooth ends of the two ends of the clutch are matched. A compressed shifting fork spring 75 causes the clutch sliding gear sleeve 71 to always be pressed to the clutch dog teeth 113, ensuring that the clutch sliding gear sleeve 71 is engaged with the clutch dog teeth 113 on the clutch input shaft after the rotational speed difference of the clutch is reduced. When the clutch needs to be disengaged, the outer shifting fork 55 directly pulls the inner shifting fork 76 out of the engaged position by means of a mechanical connection, such as a transmission pin, so that the clutch is disengaged.

Further, a chamfer 713 is disposed on an end portion of the inner teeth 711 to facilitate the engagement of the clutch sliding gear sleeve 71 with the clutch dog teeth 113.

According to the common control apparatus for parking and a clutch of this embodiment, a rotating drum 523 is added to the positioning plate 52 of the parking mechanism. The rotating drum 523 is provided with the cam groove 522, and the cam groove 522 is cooperated with the shifting fork driving cam 551. When the positioning plate 52 rotates for parking, the cam groove 522 does not move axially. When the positioning plate 52 moves for clutch control, the cam groove 522 drives the clutch shifting fork assembly to move axially to engage or disengage the clutch. The positioning plate 52 is provided with several positioning grooves 524, and the positioning grooves 524 interact with the elastic positioner 54 to lock the positioning plate 52 and the clutch shifting fork assembly in a position of parking, electric or engine direct drive, so that the motor 51 may be powered off when a vehicle is traveling, thus saving power consumption of an existing wet clutch hydraulic pump and improving the efficiency of the transmission.

As a specific embodiment, the parking mechanism further includes a parking actuating lever 56, and an end portion of the parking actuating lever 56 is provided with a driving elbow 561; the positioning plate 52 is provided with a hinge hole 526, the driving elbow 561 is hinged with the hinge hole 526, and when the positioning plate 52 rotates, the parking actuating lever 56 is pushed towards or pulled out of the position of the parking lock.

As a specific embodiment, the parking mechanism further includes a guiding plate 57, a parking pawl 58, and a parking ratchet 59 connected to a transmission output shaft; the guiding plate 57 is arranged on a transmission case, and the parking pawl 58 is arranged on the parking actuating lever 56; and under an action of the guiding plate 57, the parking actuating lever 56 presses the parking pawl 58 to the parking ratchet 59 by means of a spring 563 and a wedge 564, the parking pawl 58 is provided with a pawl tooth 583, the parking ratchet 59 is provided with parking ratchet teeth 591, and the claw tooth 583 is engaged with the parking ratchet teeth 591.

As a specific embodiment, the parking mechanism further includes a parking pawl rotating shaft 581 and a parking pawl return spring 582; and the parking pawl 58 rotates around the parking pawl rotating shaft 581, the parking pawl return spring 582 sleeves the parking pawl rotating shaft 581, and the torque of the parking pawl return spring 582 causes the parking pawl 58 to rotate in a direction of disengaging the parking ratchet 59.

As a specific embodiment, the guiding plate 57 is provided with a pawl limiting base plate 571, and the parking pawl 58 is further provided with a parking pawl limiting surface 584 which limits the parking pawl 58.

As a specific embodiment, the positioning plate 52 is connected to the rotating drum 523 by means of a rotating shaft 53, and the positioning plate 52 and the rotating drum 523 each are connected to the rotating shaft 53 by means of a fixing pin 531; and the positioning plate 52, the rotating shaft 53 and the rotating drum 523 may rotate around a fixing shaft hole 621.

As a specific embodiment, an output shaft of the motor 51 is provided with a driving gear 511, the positioning plate 52 is provided with a toothed arc 521, and the driving gear 511 is engaged with the toothed arc 521.

As a specific embodiment, the clutch mechanism further includes a bearing support assembly 4 and a housing 6, and the bearing support assembly 4 supports clutch rotating components on the housing 6.

Further, the bearing support assembly 4 includes a roller bearing 41, a first ball bearing 42, a thrust bearing 43, and a second ball bearing 45.

Further, the housing 6 includes a front housing 62, a rear housing 63, and a cover plate 61 used to cover the front housing 62 and the rear housing 63.

Figure 3:
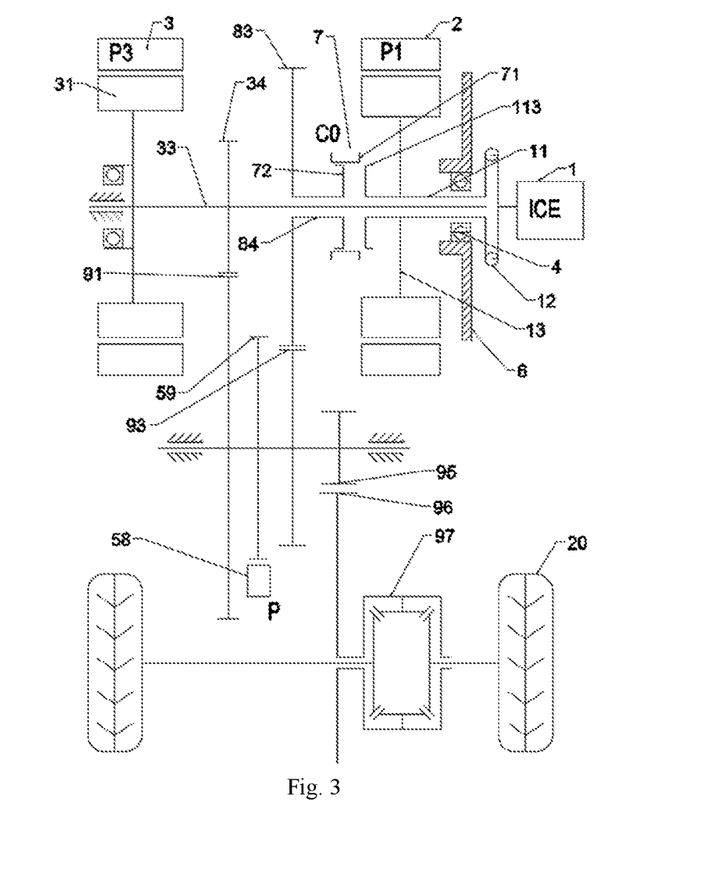
FIG. 3 is a schematic diagram of a hybrid electric vehicle transmission according to an embodiment of the present invention.
Figure 4:
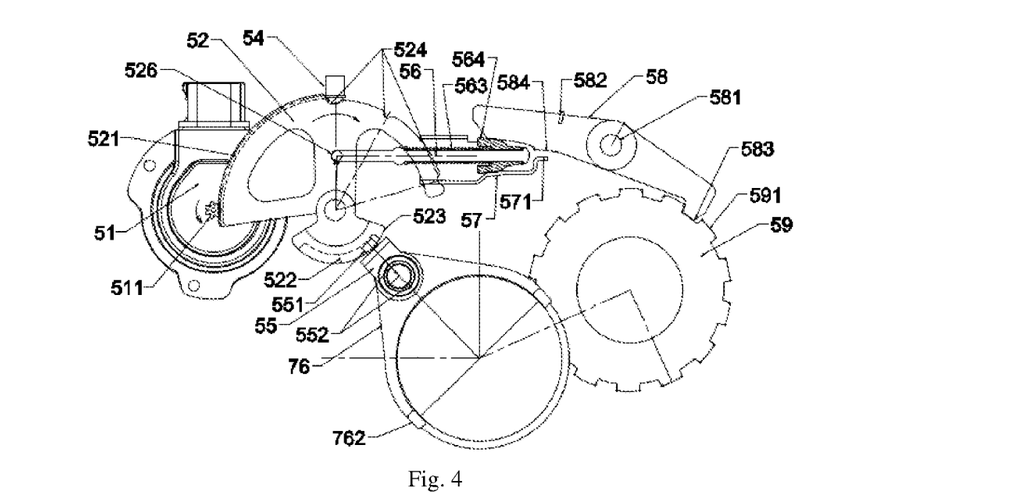
FIG. 4 is a schematic diagram of stopping a positioning plate in a parking position according to an embodiment of the present invention.
Figure 5:
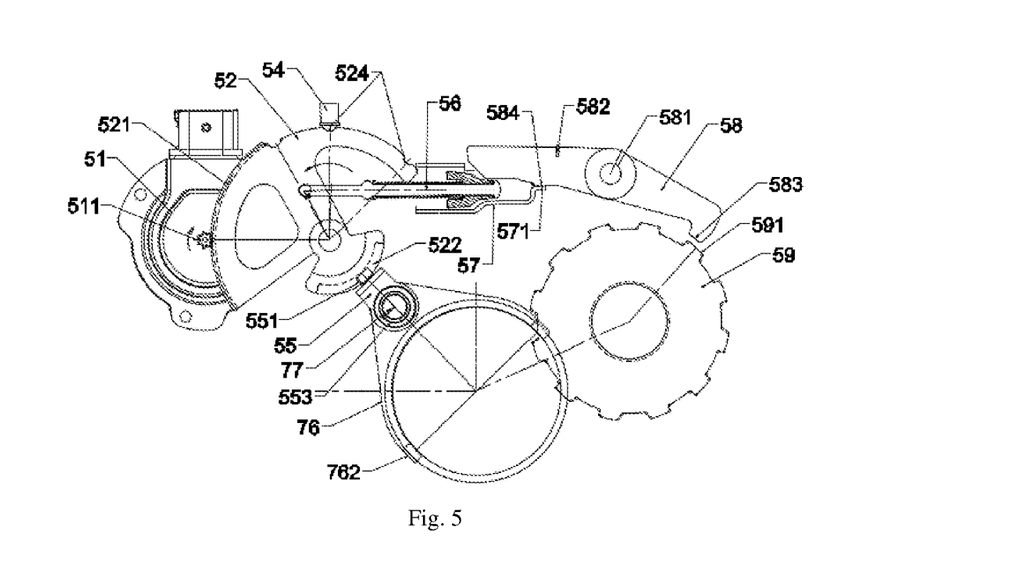
FIG. 5 is a schematic diagram of stopping a positioning plate in an electric vehicle model according to an embodiment of the present invention.

The common control apparatus for parking and a clutch of this embodiment is especially suitable for a hybrid electric vehicle transmission shown in FIG. 3. In the figure, ICE represents an engine, C0 represents a clutch, P represents parking, P1 represents a P1 motor, and P3 represents a P3 motor. An output shaft of the engine 1 is connected to a rotor of the P1 motor 2 by means of an engine damper 12 and the clutch input shaft 11, and via a connecting web plate 13. The clutch input shaft 11 is provided with a spline 111 used to connect to the engine damper 12. A rotor 31 of the P3 motor 3 driven under an urban working condition is fixedly connected to a transmission output shaft 33. A clutch 7 is used to control engagement and disengagement between the clutch output shaft 84 and the output shaft of the engine. Under a condition of sufficient battery power and an urban road condition, the clutch 7 is disengaged, and the P3 motor 3 drives wheels 20 by means of the transmission output shaft 33, gear pairs 34/91 and 95/96, and a differential 97. A total speed ratio of the gear pairs 34/91 and 95/96 is about 9, which can effectively enlarge the torque of the P3 motor 3 and improve the power of low-speed driving. At a high speed, the clutch 7 is engaged, the engine 1 drives the wheels 20 by means of the clutch 7, the clutch output shaft 84, gear pairs 83/93 and 95/96, and the differential 97. A total speed ratio of the gear pairs 83/93 and 95/96 is about 3, which can ensure high-efficiency direct drive of the engine at the high speed.

It should be noted that the common control apparatus for parking and a clutch of this embodiment is not limited to applying to the transmission using a parallel shaft mechanism. If the rotor of the P3 motor is connected to a sun gear of a planet gear mechanism, and a planet carrier outputs, the clutch output shaft 84 may be directly connected to the planet carrier. Other hybrid electric vehicles using a clutch and a parking mechanism can use the common control apparatus for parking and a clutch of this embodiment to improve the efficiency of the transmission and reduce manufacturing cost.

According to the hybrid electric vehicle transmission shown in FIG. 3, a working process of parking is as follows: still referring to FIGS. 1 to 3 and FIG. 4, the motor 51 is started to rotate counterclockwise to drive the positioning plate 52 to rotate clockwise, the parking actuating lever 56 is pushed to move right until reaching the position of the parking lock, the positioning plate 52 is positioned at the position of the parking lock by the elastic positioner 54 to achieve P-gear parking, and the motor 51 may be powered off. Under an action of the guiding plate 57, the parking actuating lever 56 presses the parking pawl 58 to the parking ratchet 59 by means of the spring 563 and the wedge 564. Once the rotational speed of the park ratchet 59 is slowed to a set value, the pawl tooth 583 on the parking pawl 58 will enter the tooth gap of the parking ratchet 59 to lock the parking ratchet 59 and brake the vehicle.

According to the hybrid electric vehicle transmission shown in FIG. 3, a working process of parking disengagement and an electric vehicle (EV) mode is as follows: still referring to FIGS. 1-3 and FIG. 5, to start the vehicle, the parking mechanism should be disengaged first. At this time, the motor 51 is started to rotate clockwise to drive the positioning plate 52 to rotate counterclockwise, the parking actuating lever 56 is pulled out of the position of the parking lock by means of the hinge hole 526, the positioning plate 52 is fixed in D gear, that is, the position of the parking disengagement, by the elastic positioner 54, and the motor 51 may be powered off. The vehicle may travel in the EV mode.

Figure 6:
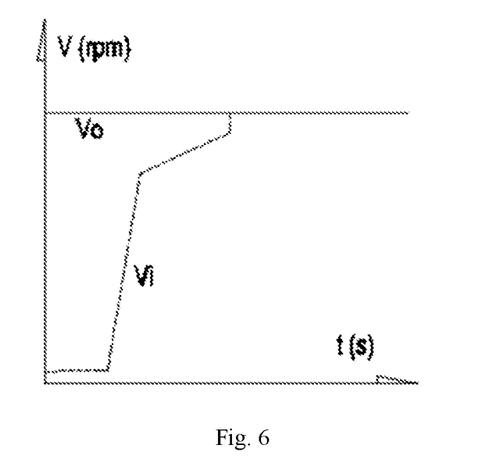
FIG. 6 is a diagram of controlling the speed of an engine during clutch engagement according to an embodiment of the present invention.

According to the hybrid electric vehicle transmission shown in FIG. 3, a working process of the clutch engagement and an engine direct drive mode is as follows: as shown in FIG. 6, t represents time, and V represents the rotational speed; and when the engine 1 is required to be used to directly drive, the P1 motor 2 quickly drags rotational speed Vi of the clutch input shaft 11 to a speed close to rotational speed Vo of the clutch output shaft 84, where Vo is the rotational speed of the clutch output shaft 84 and is determined by traveling speed of the vehicle. Still referring to FIGS. 1 to 3 and FIG. 7, the motor 51 is then started to rotate clockwise to drive the positioning plate 52 to rotate counterclockwise by about 45°. When the rotating drum 523 rotates between the positions of the parking disengagement and the clutch engagement, the shifting fork driving cam 551 is in the engagement rotation groove, and the rotating drum 523 rotates to drive the shifting fork driving cam 551 to move axially. For example, the rotating drum 523 rotating counterclockwise by 45° may force the shifting fork driving cam 551 to move axially to the right by about 6 mm. The axial displacement of the shifting fork driving cam 551 drives the outer shifting fork 55 to move axially. The outer shifting fork 55 is provided with a fixing pin 552 which may slide in the axial groove 761 on the inner shifting fork 76. When the outer shifting fork 55 moves to the right, the fixing pin 552 slides in the axial groove 761 and does not directly drive the inner shifting fork 76. However, the shifting fork spring 75 pushes the inner shifting fork 76 to the right. If the inner teeth 711 on the clutch sliding gear sleeve 71 and a tooth gap of the clutch dog teeth 113 on the clutch input shaft 11 are misaligned, the clutch sliding gear sleeve 71 may not move to the right, the inner shifting fork 76 and the clutch sliding gear sleeve 71 will stop moving axially, and the clutch sliding gear sleeve 71 will slide against an end face of the clutch dog teeth 113. Since the shifting fork spring 75 limits a contact force between the clutch sliding gear sleeve 71 and the end face of the clutch dog teeth 113, the impact and wear caused by strong shifting of an existing rigid shifting fork are avoided.

Figure 7:
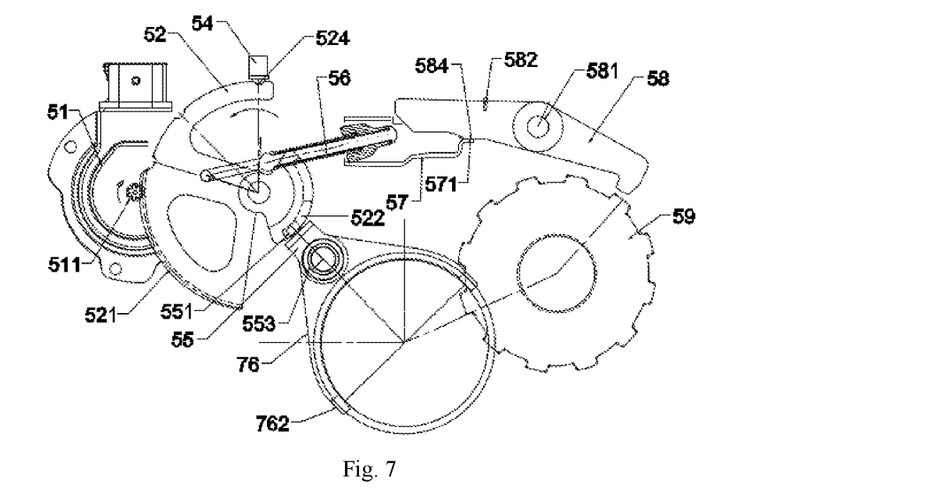
FIG. 7 is a schematic diagram of stopping a positioning plate in an engine direct drive model according to an embodiment of the present invention.

Further, to reduce frictional resistance, a rolling shaft sleeve may be installed on the shifting fork driving cam 551. The fixing pin 552 on the outer shifting fork 55 may not only prevent the outer shifting fork 55 from rotating, but also pull the inner shifting fork 76 out of the position of the engagement when the outer shifting fork 55 returns.

When the rotational speed difference Vo−Vi is greater than a designed engagement rotational speed difference (generally 20-50 rpm), the clutch sliding gear sleeve 71 and the clutch input shaft 11 will keep slipping at a tooth end. To save energy, the motor 51 may be powered off, and the outer shifting fork 55 may be locked in the position of the engagement shown in FIG. 7 by the elastic positioner 54 and the positioning grooves 524. When the positioning plate 52 rotates to the position of the engagement, the rotational speed of the P1 motor 2 is still controlled to reduce the rotational speed difference Vo−Vi. When the rotational speed difference is less than or equal to the designed engagement rotational speed difference, the inner teeth 711 of the clutch sliding gear sleeve 71 are inserted into the tooth gaps of the clutch dog teeth 113 under the pressure of the shifting fork spring 75 and drive the transmission teeth 721 to run at a same speed to complete a clutch engagement process. Due to a smaller rotational speed difference, the noise generated in the clutch engagement process is also quieter than that of an existing dog tooth clutch having large differential engagement.

According to the hybrid electric vehicle transmission shown in FIG. 3, a working process of the clutch disengagement and the electric vehicle (EV) mode is as follows: to disengage the direct drive from the engine 1, the motor 51 is started to rotate counterclockwise to drive the positioning plate 52 to rotate clockwise to a disengaging angle, the cam groove 522 forces the outer shifting fork 55 to move to the left to a position of disengagement, and the elastic positioner 54 locks the rotating drum 523 and the outer shifting fork 55 at the position of disengagement.

According to another embodiment of the present invention, there is provided an operating method of the common control apparatus for parking and a clutch in the above embodiments. The operating method includes the following steps: after the motor 51 is started, the positioning plate 52 is driven by the motor 51 to rotate, the rotating drum 523 rotates to positions corresponding to parking lock, parking disengagement, clutch engagement, and clutch disengagement respectively, when the rotating drum 523 rotates between the positions of the parking disengagement and the clutch engagement, the shifting fork driving cam 551 is located in the engagement rotation groove, the engagement rotation groove is engaged with the shifting fork driving cam 551, and the shifting fork driving cam 551 drives the clutch shifting fork assembly to move axially during rotating; and after the parking lock, the parking disengagement, the clutch engagement or the clutch disengagement is completed, the elastic positioner 54 interacts with the positioning grooves 524, and after the positioning plate 52 is positioned, the motor 51 is powered off.

As a specific embodiment, the parking mechanism further includes a parking actuating lever 56, a guiding plate 57, a parking pawl 58, and a parking ratchet 59 connected to a transmission output shaft; the guiding plate 57 is arranged on a transmission case, and the parking pawl 58 is arranged on the parking actuating lever 56; and when the rotating drum 523 is rotated to the position of the parking lock, under an action of the guiding plate 57, the parking actuating lever 56 presses the parking pawl 58 to the parking ratchet 59, and a pawl tooth 583 on the parking pawl 58 enters a tooth gap of the parking ratchet 59 to lock the parking ratchet 59.

As a specific embodiment, an end portion of the parking actuating lever 56 is provided with a driving elbow 561, the positioning plate 52 is provided with a hinge hole 526, and the driving elbow 561 is hinged with the hinge hole 526; and when the rotating drum 523 is in the position of the parking lock, the positioning plate 52 is rotated in a direction opposite to the direction along which it is rotated to the position of the parking lock, and the parking actuating lever 56 is pulled out of the position of the parking lock by means of the hinge hole 526.

As a specific embodiment, the clutch shifting fork assembly includes an outer shifting fork 55, an inner shifting fork 76, and a shifting fork spring 75, the outer shifting fork 55 sleeves the inner shifting fork 76, and the outer shifting fork 55 drives the inner shifting fork 76 by means of the shifting fork spring 75; the clutch mechanism further includes a clutch input shaft 11, a clutch sliding gear sleeve 71, and a clutch gear hub 72, the clutch input shaft 11 is provided with clutch dog teeth 113, the clutch sliding gear sleeve 71 is provided with inner teeth 711, and the clutch gear hub 72 is provided with transmission teeth 721; and when the rotating drum 523 rotates between the positions of the parking disengagement and the clutch engagement, the shifting fork driving cam 551 is rotated to drive the outer shifting fork 55 to move axially, the outer shifting fork 55 drives the inner shifting fork 76 by means of the shifting fork spring 75, the inner shifting fork 76 drives the clutch sliding gear sleeve 71 to be inserted into a tooth gap of the clutch dog teeth 113, and the inner teeth 711 of the clutch sliding gear sleeve 71 are respectively engaged with the clutch dog teeth 113 and the transmission teeth 721 to drive the transmission teeth 721 to run at a same speed.

As a specific embodiment, when the rotating drum 523 is in the position of the clutch engagement, the positioning plate 52 is rotated in an opposite direction to the position of the clutch engagement, so that the outer shifting fork 55 moves axially until the inner teeth 711 of the clutch sliding gear sleeve 71 are disengaged from the clutch dog teeth 113, and the elastic positioner 54 positions the rotating drum 523 and the outer shifting fork 55 in the position of the clutch disengagement.

According to another embodiment of the present invention, there is provided a vehicle, including the common control apparatus for parking and a clutch in the above embodiments.

The embodiments of the present invention have the following beneficial effects:

1. According to the common control apparatus for parking and a clutch, compared with a friction disc wet clutch in the prior art, a dog tooth clutch saves the costs of friction discs, a hydraulic cylinder, a hydraulic pump, a proportional pressure solenoid valve, a valve plate and other components; the clutch mechanism and the parking mechanism share a control motor, so the power consumption is very low; and since the rotating drum may be positioned by the elastic positioner and the positioning grooves, power supply of the motor is not required after the clutch is engaged, thus saving the power consumption and improving the efficiency of the transmission.

2. According to the common control apparatus for parking and a clutch and an operating method thereof, disengagement and engagement of the parking mechanism and the clutch are simultaneously controlled by one motor, and the common control apparatus is simple in structure, small in space, easy to manufacture, low in cost and high in efficiency, and can effectively solve the problems of high cost and high power consumption of a clutch actuating apparatus of an existing hybrid electric transmission; and the common control apparatus for parking and a clutch and the operating method thereof of the present invention are especially suitable for a hybrid electric vehicle transmission having controllable rotational speed difference, a low engagement time requirement and an electric parking mechanism.

The above are preferred embodiments of the present invention, and it should be noted that, for those of ordinary skill in the art, several improvements and modifications may be made without departing from the principle of the present invention, and the improvements and modifications are also regarded to be within the protection scope of the present invention.

What is claimed is:

1. A common control apparatus for parking and a clutch, the control apparatus comprising a parking mechanism, a clutch mechanism, and a motor, wherein
the parking mechanism comprises a positioning plate, an elastic positioner, and several positioning grooves; a rotating drum is in linkage connection to the positioning plate, the positioning grooves are arranged on the positioning plate, the positioning plate rotates under the driving of the motor, the elastic positioner interacts with the positioning grooves, and the rotating drum can rotate to positions corresponding to parking lock, parking disengagement, clutch engagement, and clutch disengagement;
the clutch mechanism comprises a clutch shifting fork assembly and a shifting fork driving cam arranged on the clutch shifting fork assembly, and the shifting fork driving cam drives the clutch shifting fork assembly to move axially during rotating; and
the rotating drum is provided with a cam groove, and the cam groove comprises an engagement rotation groove and a straight; when the rotating drum rotates between the positions of the parking lock and the parking disengagement, the shifting fork driving cam is located in the straight groove; and when the rotating drum rotates between the positions of the parking disengagement and the clutch engagement, the shifting fork driving cam is located in the engagement rotation groove, and the engagement rotation groove is engaged with the shifting fork driving cam,
wherein the positioning plate is connected to the rotating drum by means of a rotating shaft, and the positioning plate and the rotating drum each are connected to the rotating shaft by means of a fixing pin.

2. The common control apparatus for parking and a clutch according to claim 1, wherein the clutch shifting fork assembly comprises a shifting fork guiding shaft, an outer shifting fork, and an inner shifting fork, the inner shifting fork sleeves the shifting fork guiding shaft, the outer shifting fork sleeves the inner shifting fork, the outer shifting fork is provided with a fixing pin, the inner shifting fork is provided with an axial groove, and the fixing pin slides in the axial groove.

3. The common control apparatus for parking and a clutch according to claim 2, wherein a shifting fork spring is arranged between the outer shifting fork and the inner shifting fork, and the outer shifting fork drives the inner shifting fork by means of the shifting fork spring.

4. The common control apparatus for parking and a clutch according to claim 3, wherein the clutch mechanism further comprises a clutch input shaft, a clutch sliding gear sleeve, and a clutch gear hub, and the clutch sliding gear sleeve sleeves the clutch gear hub;
the clutch input shaft is provided with clutch dog teeth; and
the clutch sliding gear sleeve is connected to the shifting fork guiding shaft by means of a shifting fork foot, and the shifting fork foot is arranged on the periphery of the clutch sliding gear sleeve; and the clutch sliding gear sleeve is provided with inner teeth and a circumferential groove cooperated with the inner shifting fork, the clutch sliding gear sleeve is inserted into a tooth gap of the clutch dog teeth under an action of the shifting fork spring, the clutch gear hub is provided with transmission teeth, and the inner teeth are respectively engaged with the clutch dog teeth and the transmission teeth.

5. The common control apparatus for parking and a clutch according to claim 1, wherein the parking mechanism further comprises a parking actuating lever, and an end portion of the parking actuating lever is provided with a driving elbow; and
the positioning plate is provided with a hinge hole, the driving elbow is hinged with the hinge hole, and when the positioning plate rotates, the parking actuating lever is pushed towards or pulled out of the position of the parking lock.

6. The common control apparatus for parking and a clutch according to claim 5, wherein the parking mechanism further comprises a guiding plate, a parking pawl, and a parking ratchet connected to a transmission output shaft; the guiding plate is arranged on a transmission case, and the parking pawl is arranged on the parking actuating lever; and under an action of the guiding plate, the parking actuating lever presses the parking pawl to the parking ratchet by means of a spring and a wedge, and the parking pawl is engaged with the parking ratchet.

7. The common control apparatus for parking and a clutch according to claim 6, wherein the parking mechanism further comprises a parking pawl rotating shaft and a parking pawl return spring; and the parking pawl rotates around the parking pawl rotating shaft, the parking pawl return spring sleeves the parking pawl rotating shaft, and the torque of the parking pawl return spring causes the parking pawl to rotate in a direction of disengaging the parking ratchet.

8. The common control apparatus for parking and a clutch according to claim 1, wherein an output shaft of the motor is provided with a driving gear, the positioning plate is provided with a toothed arc, and the driving gear is engaged with the toothed arc.

9. An operating method of the common control apparatus for parking and a clutch according to claim 1, the operating method comprising the following steps:

after the motor is started, driving the positioning plate by the motor to rotate, and allowing the rotating drum to rotate to positions corresponding to parking lock, parking disengagement, clutch engagement, and clutch disengagement respectively, wherein when the rotating drum rotates between the positions of the parking disengagement and the clutch engagement, the shifting fork driving cam is located in the engagement rotation groove, the engagement rotation groove is engaged with the shifting fork driving cam, and the shifting fork driving cam drives the clutch shifting fork assembly to move axially during rotating; and after the parking lock, the parking disengagement, the clutch engagement or the clutch disengagement is completed, allowing the elastic positioner to interact with the positioning grooves to position the positioning plate, and then powering off the motor.

10. The operating method of the common control apparatus for parking and a clutch according to claim 9, wherein the parking mechanism further comprises a parking actuating lever, a guiding plate, a parking pawl, and a parking ratchet connected to a transmission output shaft; the guiding plate is arranged on a transmission case, and the parking pawl is arranged on the parking actuating lever; and when the rotating drum is rotated to the position of the parking lock, under an action of the guiding plate, the parking actuating lever presses the parking pawl to the parking ratchet, and a pawl tooth on the parking pawl enters a tooth gap of the parking ratchet to lock the parking ratchet.

11. The operating method of the common control apparatus for parking and a clutch according to claim 10, wherein an end portion of the parking actuating lever is provided with a driving elbow, the positioning plate is provided with a hinge hole, and the driving elbow is hinged with the hinge hole; and when the rotating drum is in the position of the parking lock, the positioning plate is rotated in a direction opposite to the direction along which it is rotated to the position of the parking lock, and the parking actuating lever is pulled out of the position of the parking lock by means of the hinge hole.

12. The operating method of the common control apparatus for parking and a clutch according to claim 9, wherein the clutch shifting fork assembly comprises an outer shifting fork, an inner shifting fork, and a shifting fork spring, the outer shifting fork sleeves the inner shifting fork, and the outer shifting fork drives the inner shifting fork by means of the shifting fork spring; the clutch mechanism further comprises a clutch input shaft, a clutch sliding gear sleeve, and a clutch gear hub, the clutch input shaft is provided with clutch dog teeth, the clutch sliding gear sleeve is provided with inner teeth, and the clutch gear hub is provided with transmission teeth; and when the rotating drum rotates between the positions of the parking disengagement and the clutch engagement, the shifting fork driving cam is rotated to drive the outer shifting fork to move axially, the outer shifting fork drives the inner shifting fork by means of the shifting fork spring, the inner shifting fork drives the clutch sliding gear sleeve to be inserted into a tooth gap of the clutch dog teeth, and the inner teeth of the clutch sliding gear sleeve are respectively engaged with the clutch dog teeth and the transmission teeth to drive the transmission teeth to run at a same speed.

13. The operating method of the common control apparatus for parking and a clutch according to claim 12, wherein when the rotating drum is in the position of the clutch engagement, the positioning plate is rotated in an opposite direction to the position of the clutch engagement, so that the outer shifting fork moves axially until the inner teeth of the clutch sliding gear sleeve are disengaged from the clutch dog teeth, and the elastic positioner positions the rotating drum and the outer shifting fork in the position of the clutch disengagement.

14. A vehicle, comprising the common control apparatus for parking and a clutch according to claim 1.

* * * * *